(12) United States Patent
Steinhovden

(10) Patent No.: US 6,216,834 B1
(45) Date of Patent: Apr. 17, 2001

(54) ARRANGEMENTS IN A PROTECTION CONTAINER FOR AN ELECTRICAL CABLE

(76) Inventor: Knut O. Steinhovden, Høgevollstubben 14, Sandnes (NO), N-4327

( * ) Notice: Subject to any disclaimer, the term of this patent is extended or adjusted under 35 U.S.C. 154(b) by 0 days.

(21) Appl. No.: 09/319,630

(22) PCT Filed: Nov. 25, 1997

(86) PCT No.: PCT/NO97/00316

§ 371 Date: Jul. 29, 1999

§ 102(e) Date: Jul. 29, 1999

(87) PCT Pub. No.: WO98/26485

PCT Pub. Date: Jun. 18, 1998

(51) Int. Cl.[7] .................................................. H02G 11/02
(52) U.S. Cl. ...................... 191/12.4; 191/12 R; 191/12.2; 242/388.9; 242/396.1
(58) Field of Search ................................. 191/12 R, 12.2, 191/12.4; 242/388.9, 388.91, 396, 396.1, 397

(56) References Cited

U.S. PATENT DOCUMENTS

| 1,844,511 | 2/1932 | Kiffe . | |
|---|---|---|---|
| 2,225,859 | * 12/1940 | Cox | 299/77 |
| 2,648,052 | * 8/1953 | Graham et al. | 399/109 |
| 2,984,714 | 5/1961 | Kunkle . | |
| 4,235,419 | * 11/1980 | Schuck | 191/12 R |
| 4,569,490 | * 2/1986 | Church | 242/107 |
| 4,935,155 | * 6/1990 | Steiner | 211/197 |
| 5,117,859 | 6/1992 | Carlson . | |
| 5,788,064 | * 8/1998 | Sacherer et al. | 206/204 |

\* cited by examiner

Primary Examiner—S. Joseph Morano
Assistant Examiner—Frantz F. Jules
(74) Attorney, Agent, or Firm—Andrus, Sceales, Starke & Sawall, LLP

(57) ABSTRACT

An upright protection container (10) having an upper hatchway (38) which can be closed by means of a hatch cover (36, 36', 36") rotatable about an upper horizontal axis (40), is equipped with a withdrawal device (20, 22, 24) provided with a weight (22) and assigned a cable (12) which, at the free end, has a plug (14) intended to be plugged into e.g. an engine heater's socket (46). The hatch cover (36, 36', 36") has a ratchet segment (42) in the form of toothed segment in engagement with a ratchet wheel (28') with a circumferential toothing and incorporated into a combined cable guide pulley-ratchet wheel unit over a certain pivotal angle area (e.g. 30°) of the total rotation (e.g. 90°) of the hatch cover (36, 36', 36"), between completely open end position and completely closed, down hanging end position, so that the hatch cover (36, 36', 36") is blocked in an open intermediate position (e.g. 35° between the plane of the hatch cover and a vertical plane extending through the rotational axis (40)), simultaneously as the guide pulley-ratchet wheel unit (28, 30, 28') is blocked. This secures that the hatch cover automatically is kept open while the live cable (12) with its plug (14) is in use, simultaneously as undesired feed-out of surplus cable length is prevented upon the blockage of the guide pulley-ratchet wheel unit (28, 30, 28') .

11 Claims, 3 Drawing Sheets

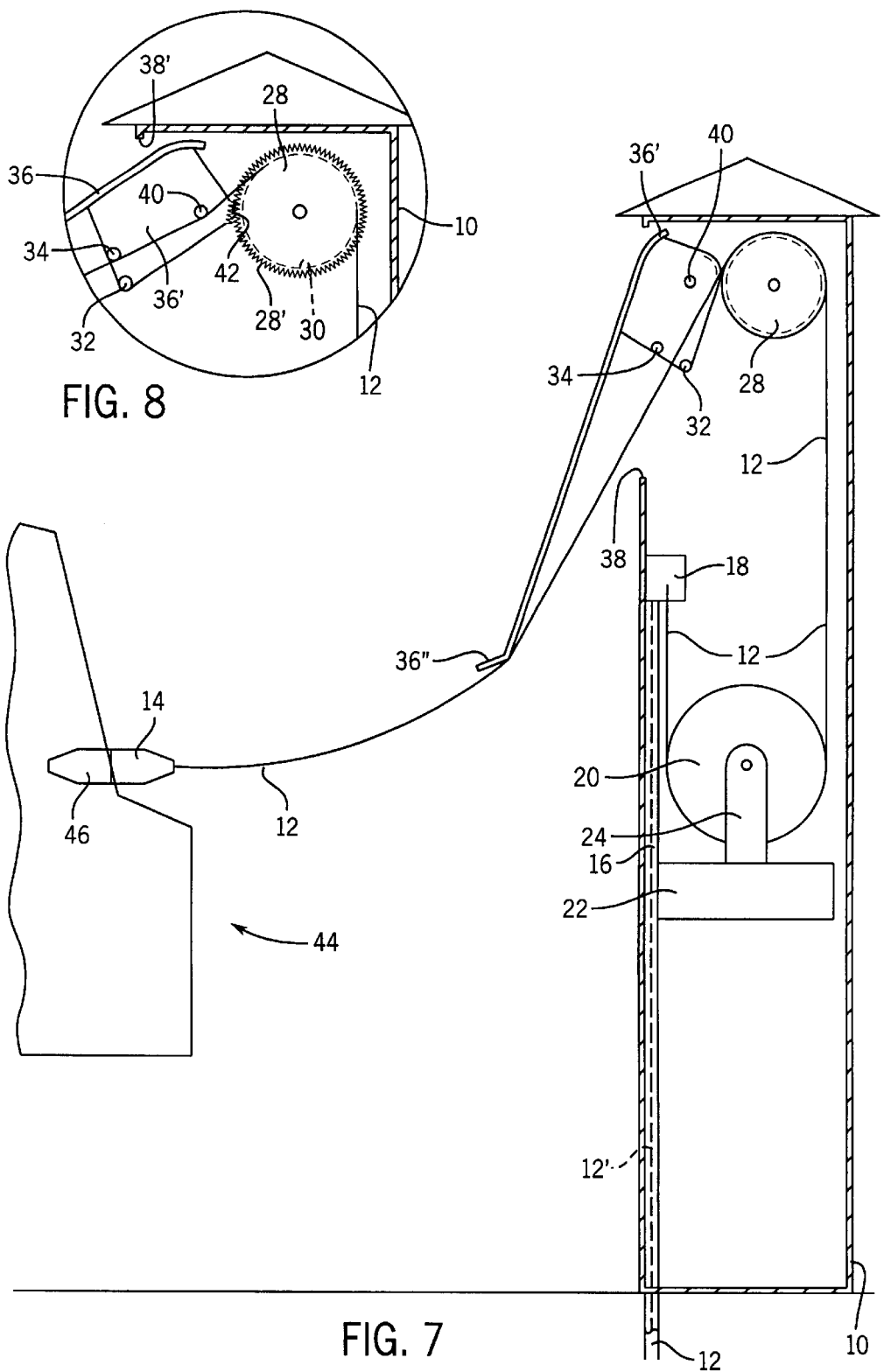

ARRANGEMENTS IN A PROTECTION CONTAINER FOR AN ELECTRICAL CABLE

BACKGROUND OF THE INVENTION

The present invention relates to arrangements in a protection container in order to enable feed-out of an electrical cable stored within the protection container, said cable, at one end thereof, having a plug/socket and, at the other end thereof, is supplied with electrical power, and wherein feed-in/withdrawal of the electrical cable into the protection container again is allowed after use.

Such a cable having a contact means of the plug or socket type at the free end thereof and, preferably, coupled to a power supply at the other end, can be used in connection with an electrical apparatus, machine or other device/means carrying a complementary contact means, e.g. a socket or a plug, respectively, the two mutually complementary contact means being plugable, one within the other. Said electrical apparatus, etc., may e.g. be constituted by engine heaters in motor vehicles, battery charging apparatus for electrical vehicles and the like. The cable may possibly be provided with signal conductors which, through remote control, may start/stop e.g. a motor heater or other apparatus.

Norwegian patent application No. 961492 discloses a feed-out device for a plug adapted to be plugged into a socket and positioned at the end of an electrical cable assigned a power supply. This automatically functioning feed-out device is not assigned a protection container as the one according to the present invention for the protective envelopment of cable with plug/socket, but serves exclusively to secure a controlled feed-out of the electrical cable's plug when it is pulled out from the socket in which it is plugged, the socket being incorporated into said electrical apparatus, etc., e.g. the engine heater; in case one has forgotten to haul the electrical cable's plug out from the socket of the engine heater.

When using engine heaters in motor vehicles, the electrical cable together with its plug, after the latter has been released upon being pulled out from the socket of the engine heater, often becomes lying unprotectedly on the ground, subjected to being overrun and damaged. In such an unprotected position, dirt and other impurities will easily find their way into the plug, and cable and plug can freeze firmly to the ground during periods of frost in the winter time. The plug at the end of the live electrical cable, in an unprotected position, lying on the ground, represents a risk factor for children. Upon contact with metal parts of the plug, a child may get an electrical shock.

Norwegian patent specification No. 165 088 discloses an apparatus adapted to cause an automatic hauling of the electrical cable's plug up to a higher positioned level in a garage or the like. This prior art apparatus is very comprehensive. As mentioned, it is based on an operation including a hauling of the plug of the cable up to a position in which it is not available to a child, i.e. a position in which the plug does not represent a risk factor, but the apparatus does not comprise a protection container for protective envelopment of cable and plug/socket in an inoperative position of readiness. For the installation thereof, this known hauling apparatus requires a column of a not insignificantly height.

SUMMARY OF THE INVENTION

Therefore, the object of the present invention has been to eliminate or, to a substantial degree, reduce deficiencies, disadvantages and restrictions of use associated with prior art technique as represented through the above-mentioned Norwegian patent publications and, thus, provide a protection container in which cable with plug/socket are protectively enclosed in inoperative position of readiness, and from where the cable can be pulled out through the plug/socket at the end thereof, in order to plug the cable's plug into the socket of the engine heater, etc., tensioning the cable appropriately in the position of use, the cable and, thus, the plug/socket not being subjected to undesired external tractive forces in this position of use, but where the cable with the plug/socket, after use, is subjected to a controlled withdrawal into the protection container.

Another object consists in providing a protection container which is closed in the protective position and formed with a hatchway which can be closed/opened by means of a movable hatch cover which, in addition to its primary tasks, to open or to close the hatchway of the protection container as well as to enable operations resulting in the feed-out/feed-in of the cable respectively enclosing the cable with its plug/socket protectively within a closed container, is adapted to participate in a tensioning feed-in displacement of a cable which has been pulled too far out when it was plugged into e.g. an engine heater's socket, respectively is adapted to be retained in a locked intermediate position between wholly open and closed position, in order to counteract that the cable with the plug becomes subjected to tractive forces from the protection container's feed-in device in the position of use.

The hatch cover may be lockable, possibly through timed payment device (as a parking-meter).

Likewise, one has aimed at providing a protection container in which the hatch cover is pivotable about an upper, substantially horizontal axis at the top of the protection container, and wherein the hatch cover's tooth segment, friction surface segment or the like extends along a fraction of 360° and cooperates with a rotatable ratchet wheel having a toothing, cogging, friction surface or the like along the entire circumference thereof, and along which the cable has been placed, e.g. in a circumferential groove, outside the toothing, cogging, friction surface, etc., and is guided during feed-out (drawing out) and feed-in (withdrawal).

As the ratchet segment of the hatch cover follows the pivotal movement of the latter, it only engages the ratchet wheel during a certain rotational angle zone for the hatch cover, e.g. within a pivotal angle area of 17–47° for the hatch cover in relation to vertical. The ratchet segment can circumferentialwise extend across about 30° in relation to the substantially horizontal pivotal axis of the hatch cover. Thus, the ratchet segment of the hatch cover is out of engagement with said rotatable ratchet wheel in the completely swung up (substantially horizontal) position of the hatch cover and in the completely swung down (substantially vertical) position thereof.

The pivotal movability of the hatch cover and the mentioned ratchet device for the same cause that the electrical cable with the end plug, from a protected storage position within the protection container, unhindered can be pulled out after the hatch cover has been swung up. A cable which has been pulled out to an extensive length, enabling the pulled out cable length to hang down, reaching the ground wholly or partly after the plug thereof has been plugged into the socket of e.g. an engine heater, will be withdrawn into the protection container's opening until the cable is tensioned to an appropriate stretching, while the hatch cover swings down until its ratchet segment is in engagement with the ratchet wheel and is locked in this slopingly downwardly directed, intermediate, open position, fixing the cable in this adequately stretched position of use until there no longer exists a need for transfer of electrical power to the engine heater. Then, the locking of the hatch cover is neutralized, whereafter it is retained in an non-locked, open position while the feed-in means of the protection container pulls the cable into the container again. The hatch cover may have at least one stop for limiting the withdrawal of the cable's plug/socket, so that it at any time will take an easily available position after the cover has been swung up.

The protection container's withdrawal means may be based on weight and/or spring means.

The ratchet wheel which also operates as a guiding wheel for the cable, may be formed with one or two parallel, 360° extending circumferential grooves placed laterally of the annular ratchet portion (toothing/friction surface). It may, namely, be desirable to place the cable two times around the ratchet wheel, in order to prevent it from skidding or sliding within a single groove when the ratchet wheel is inlocked engagement with the ratchet segment. Advantageously, said groove may have the form of a wedge/key groove, the groove-defining annular surfaces thereof converging inwardly in the radial direction.

When the cable withdrawal device of the protection container is based on the use of a vertically movable weight, the latter may suitably carry a tackle in the form of a groove wheel. In the lower portion of the protection container, the cable is guided into a pipe, and leads e.g. to a contact fastened to the inner container wall for, thereafter, to extend partially around the circumference of said tackle, lying in the circumferential groove thereof, and, thereafter, partially around the ratchet wheel after having travelled aconsiderable vertical distance, whereafter the plug of the cable is conveyed into guiding engagement with stop means of the hatch cover.

In order to secure a rectilinear vertical displacement movement of the weight, it may be formed with a vertically through-going edge groove into which said pipe engages, forming an appropriate clearance therebetween, in order to secure the slidable displacement of the weight, guided along the fixed pipe.

In order to procure at one's disposal a larger cable length that may be pulled out, e.g. to an engine heater, etc., which because of narrow spatial conditions is located at a fairly substantial distance from the protection container, the protection container may internally being provided with a rotary drum having a reel onto which is wound an electrical cable, in order to enable the feed-out of a larger cable length by unwinding cable from said drum reel.

The cable used may be a rubber coated, steel reinforced cable.

BRIEF DESCRIPTION OF THE SEVERAL VIEWS OF THE DRAWINGS

A non-restricting example of one at present preferred embodiment of a protection container having a cable withdrawal means as shaped and designed in accordance with the invention is further explained in the following, reference being made to the accompanying drawings, in which:

FIG. 7 corresponds to FIGS. 1 and 5, but shows the hatch cover in a blocked, downwardly sloping intermediate position; the plug/socket of the cable is indicated in plugged in position into e.g. an engine heater of a motor vehicle, and wherein it appears that the cable in this position of use has been allotted an appropriate tensioning by means of the withdrawal means;

FIG. 8 is a partial view of the protection container showing its operation;

DETAILED DESCRIPTION OF THE INVENTION

Figure 1:
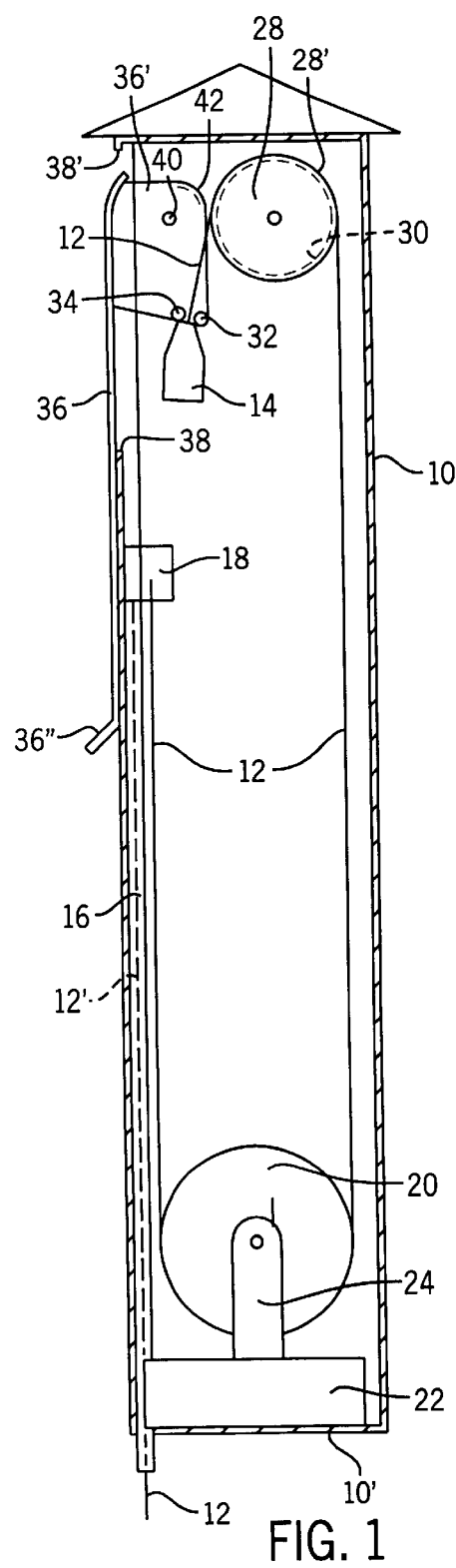
FIG. 1 shows a vertical axial section through a protection container having a withdrawal means for a live, insulated cable equipped with an end plug/end socket, the cable with the plug/socket in the entirety being protectively enclosed within the protection container.

FIG. 1 shows a protection container 10 for a cable 12 equipped with a plug/socket 14 at the upper end. In the embodiment shown, a longitudinal cable portion 12' extends through a vertical, stationary pipe 16, which may be attached to the protection container's 10 inner wall face, to an e.g. underlying power supply, not shown. From the upper end of the pipe 16 which is situated closer to the top of the protection container 10 than the bottom 10' thereof, the cable 12 passes through an electrical current connector 18. Therefrom, the cable 12 passes vertically downwardly where it, at the lowermost portion thereof, is placed around a tackle 20 in the form of a groove disc carried by a circle-disc-shaped weight 22, which carries upright bearing ears 24 for the rotary mounting of the tackle 20.

In the examplary embodiment, the weight 22 together with the bearing ears 24 and the tackle 20 form a force-exerting means of the withdrawal device for hauling the cable back into the protection container 10. Alternatively, the weight 22 might be deleted and replaced by a spring device exerting a downwardly directed force on the tackle 20. A suitably heavy weight 22 may e.g. be about 5 kg.

When a weight 22 is used in the cable withdrawal device of the protection container 10, the vertical, cable-surrounding pipe 16 which is fixedly mounted to the inner side face of the tubular protection container 10, can be utilized to guide the weight 22, so that the latter is guaranteed a vertical, rectilinear displacement movement, without liabilities to rotation, which would have been disadvantageous to the controlled, guided course of the cable 12.

Figure 3:
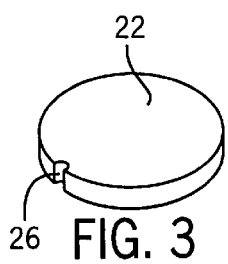
FIG. 3 shows a weight of a special embodiment, usable in the cable withdrawal means of the protection container, seen in a perspective view obliquely from above.
Figure 4:
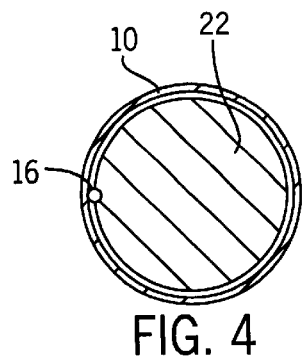
FIG. 4 shows a horizontal view through the weight according to FIG. 3, the protection container and a pipe in which said cable passes from an underlying connection place at a power supply (not shown), and wherein the vertical pipe firmly mounted to the container inner wall moreover serves as a guide for the weight, the pipe being in slidingly displacable engagement with a vertically through-going edge groove at the circle-disc-shaped circumference of the weight.

According to FIG. 3, the circular-disc-shaped weight 22 may be formed with a vertically through-going edge groove 26. In accordance with FIG. 4 it appears that the pipe 16 engages slidingly into this edge groove 26, where the clearance between the circumferential face defining the edge groove and the outer face of the pipe 16 is sufficient to secure an easily slidable displacement of the weight 22 up and down along the pipe 16.

From the tackle 20, the cable 12 extends vertically upwards to a freely rotatable guide pulley 28 which may be shaped as a groove disc. The groove is shown in a dotted line and denoted at reference numeral 30. Simultaneously, the guide pulley 28 is shaped as a ratchet wheel across a part of the thickness thereof, here represented by a 360° extending toothing 28', which could have been replaced by a 360° friction wheel portion (not shown).

Figure 2:
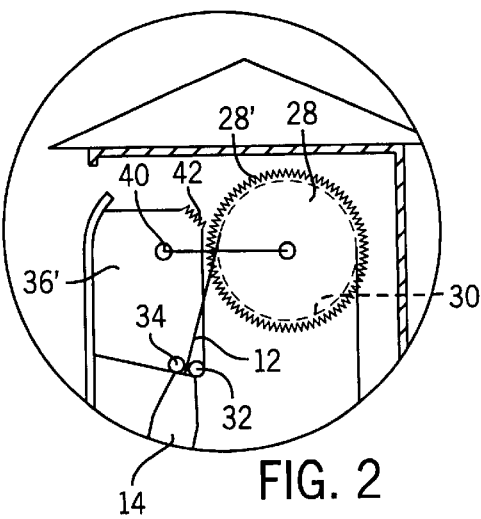
FIG. 2 shows an encircled, enlarged partial view of an upper portion of the protection container of FIG. 1, in the area of the pivotal mounting and ratchet device of the hatch cover; said upper portion possibly being rotary in relation to the lower portion of the protection container.

In order to prevent that the cable shall slide in the groove of the guide pulley 28, the groove may be formed as a wedge groove having a V-like cross-sectional shape, where the groove defining wall surfaces converge against each other radially inwardly. To further avoid skidding, the guide pulley 28 may have at least two guide grooves for the cable, possibly in the form of two parallel wedge grooves, so that the cable 12 will extend itself two times around the guide pulley 28, before the free end thereof carrying the plug/socket 14 is brought into engagement with a stop 32, possibly between two adjacent stops 32, 34 placed on an armature 36' constituting a part of a hatch cover 36 which, in the position according to FIGS. 1 and 2, closes an upper hatchway 38 in the form of an aperture through which the cable with its plug/socket 14 is pulled out and hauled in relative to the protection container 10.

In the shown embodiment of the hatch cover 36, the same is pivotally mounted about an upper shaft 40 which is substantially horizontal. It appears that the hatch cover 36, in closed position according to FIG. 1, overlaps a container wall portion extending downwardly from the hatchway 38 for sealing purposes and, lowermost, an inclinedly downwardly directed, angulated handle part 36" is formed, for the upwards/downwards pivotal movements of the hatch cover 36.

A very important feature of the present invention is constituted by the ratchet portion of the hatch cover 36, said portion having the form of a toothed segment 42 adapted for periodical engagement into and cooperation with the 360° circumferential toothing 28' of the guide pulley 28. If the ratchet portion 28' of the guide pulley, instead of the toothing, is provided with a 360° frictional face portion along the circumference, the hatch cover's 36 segment-shaped ratchet portion, instead of teeth, be formed with a corresponding frictional face segment which, in the same way as the tooth segment 42, is adapted to cooperate hatch-cover-position-blockingly with the annular frictional face portion across a certain angle of rotation area for the hatch cover 36. In the shown embodiment, this angle area can be limited between the angles of 17° and 47° in relation to a vertical plane which e.g. passes through the horizontal rotational axis 40 of the hatch cover 36 and, in relation to this axis 40, the hatch segment 42 may e.g. extend across a circular arc of 30°.

Figure 6:
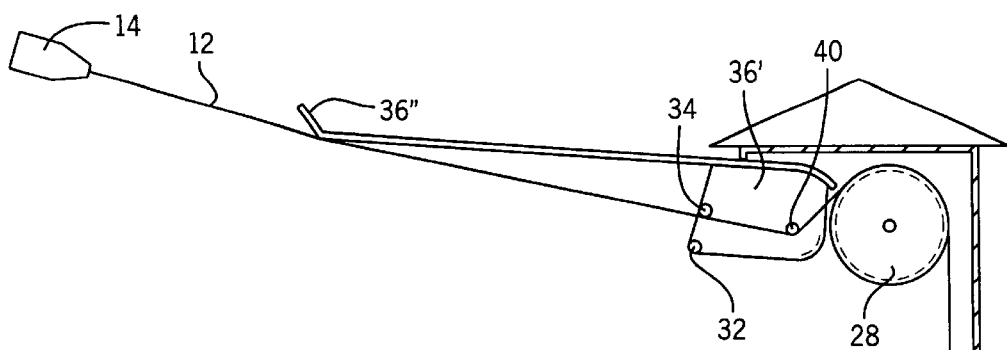
FIG. 6 corresponds to FIG. 2, but shows the hatch cover, a ratchet wheel and the cable in the positions they take acording to FIG. 5.
Figure 6:
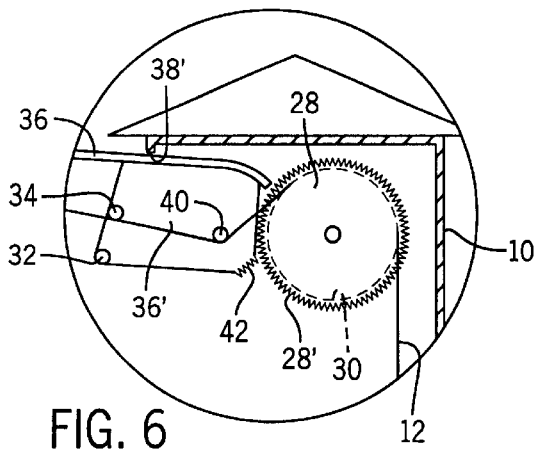
Figure 5:
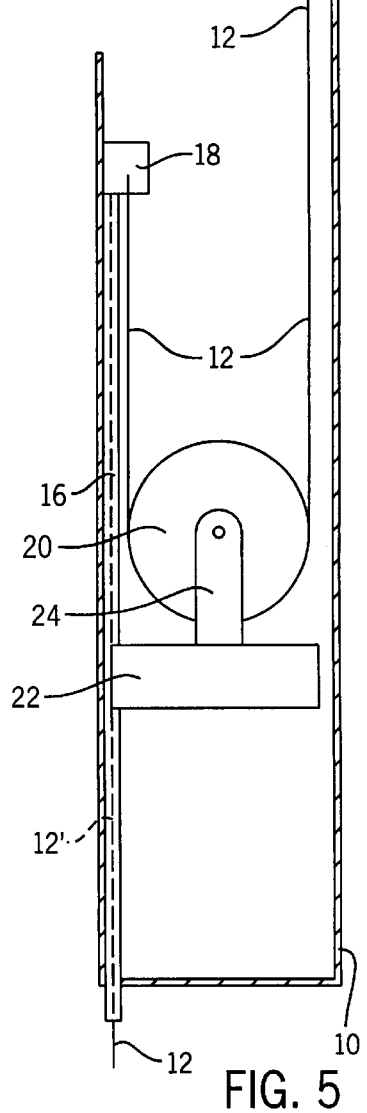
FIG. 5 corresponds to FIG. 1, but shows the hatch cover in a completely swung up, substantially horizontally lying position, in which the blocking action is neutralized when the cable is being pulled out.

When the cable 12 with the plug/socket 14 shall be used, the hatch cover 36 is swung up about its horizontal rotational axis 40 into the completely swung up, approximately horizontal end position thereof, FIGS. 5 and 6, and, during this rotational movement, the ratchet segment 42 has been in engagement with the ratchet wheel 28' of the guide pulley 28. The blocking action across this rotational angle area for the hatch cover 36 during its upwardly directed rotational movement into completely open end position, is overcome by the applied, upwardly directed manual force exerted on the hatch cover 36 during the opening movement thereof.

However, in the completely swung up, open position of the hatch cover 36, the blocking action which was established by the engagement of the ratchet segment 42 into the ratchet wheel portion 28' of the cable guide pulley 28, is neutralized, see especially FIG. 6, from where it clearly appears that a quite insignificant downwardly directed rotational movement of the hatch cover 36, anti-clockwise about the rotational axis 40, will introduce its ratchet segment's 42 engagement into the ratchet wheel portion 28' of the guide pulley 28 and, thus, start the blocking engagement therebetween, in order to automatically establishing a blocked position for the hatch cover 36 in an open intermediate position when the plug thereof has been plugged into the socket 46 of e.g. a motor vehicle's 44 engine heater.

Thus, when electrical contact has been established between the cable's plug 14 and the engine heater's socket 46, one can let go one's hold of the hatch cover 36 which, then, due to the weight thereof and the significant extent between its free end at the handle portion 36" and the axis 40, swings downwardly until the ratchet segment 42 of the hatch cover 36 comes into complete or nearly complete engagement with the ratchet wheel portion 28' of the freely rotatable guide pulley.

The blocking action established is illustrated in FIGS. 7 and 8, wherein the hatch cover's 36, 36',36" twisting moment in respect of the axis 40 acts on the guide pulley/ratchet wheel 28, 28'. Thus, in this blockage position, the hatch cover 36, 36',36" retains the guide pulley/ratchet wheel 28, 28' in a locked, non-rotatable position, while the guide pulley/ratchet wheel 28, 28' retains the hatch cover 36, 36', 36", likewise, in a locked, non-pivotal position.

When one let go one's hold of the hatch cover 36, 36', 36" after the plug has been plugged into the socket 46 of an engine heater, etc., the hatch cover's ratchet segment 42, FIGS. 5 and 6, is not, however, in engagement with the ratchet wheel portion 28' of the guide pulley 28 and, prior to the engagement is established upon further downwards pivotal movement of the hatch cover 36, 36', 36 ", the weight 22 together with bearing ears 24 and tackle 20 of the cable withdrawal device has the possibility of pulling in a portion of the cable 12 drawn out. By means of a relatively simple adaption work between cooperating parts it could be guaranteed, based on a drawn out cable length comprising an excessive longitudinal cable piece, that the cable length is shortened to form an adequately tensioned cable, FIG. 7, upon its withdrawal into the protection container 10 during the downwardly directed pivotal movement of the hatch cover 36, 36', 36" towards the blocked, open intermediate position, FIGS. 7 and 8. If the cable 12 is slacker than as shown in FIG. 7, or is resting on the ground, the cable 12 will in a similar way be pulled into the protection container 10 until the ratchet segment 42 enters into engagement with the ratchet wheel portion 28'. If the plug 14 is not attached to a socket 46, the plug will automatically be pulled into the protection container 10.

When the cable 12 is pulled out, the withdrawal device' active means, the weight, the bearing ears and the tackle, is pulled upwardly, and the length of the cable and the level of the electrical connector/contact 18 must be adjusted such in relation to each other that the tackle 20, upon the expected maximum pulled out cable length, will not make an impact on the underside of said electrical connector/contact 18. Alternatively, a stop can be disposed. The extent of cable length capable of being pulled out can be increased by the arrangement of a rotary cable drum in the cavity of the protection container 10, on which cable drum a certain cable length has been wound.

When there no longer is any need for the cable 12 and its plug/socket, the latter is pulled out from its engagement with the engine heater's socket/plug 46, simultaneously as the hatch cover 36, 36', 36" is swung a little up or down in order to neutralize the engagement of the ratchet segment 42 into the ratchet wheel portion 28' of the guide pulley 28, so that the drawn out cable length automatically is pulled into the protection container 10 through the hatchway 38, FIG. 1. When the cable's 12 plug/socket 14 has arrived in a movement-restricting position resting against the hatch cover's 36, 36', 36" one stop 32 or between both stops 32, 34, the hatch cover will be closed, whereafter the plug/socket 14 and the hatch cover 36, 36', 36" take their respective inoperative positions of readiness according to FIG. 1.

The hatch cover's rotational shaft 40 may be positioned such that it forms a guide means for the cable 12 in the open positions (FIGS. 5–8) of the hatch cover 36, 36', 36".

The upper edge 38' of the hatchway 38 may be placed at such a level in relation to the rotational shaft 40 of the hatch cover 36, 36', 36" and to the shape and design of the hatch cover that this edge 38' will form a rotation-restricting stop for the hatch cover 36, 36', 36" in the uppermost, approximately horizontal, completely open position thereof, FIGS. 5 and 6.

What is claimed is:

1. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container.

2. The apparatus of claim 1 wherein the protection container is an upright, tubular hollow body which, at the uppermost end thereof, is formed with a closure closing a top end of the protection container.

3. The apparatus of claim 1 wherein the pivotal movement of the hatch cover toward the horizontal, end position is restricted by an upper edge defining the hatchway and the pivotal movement of the hatch cover toward the closed position is restricted by an outer mantle face portion of the protection container, wherein a lower end of the hatch cover extends below a lower hatchway defining edge when the hatch cover is in the vertical, closed position.

4. The apparatus of claim 1 wherein the axial end of the hatch cover adjacent to the horizontal rotational axis includes at least one stop for the first contact means of the cable in order to prevent the first contact means from being completely withdrawn into the protection container when the hatch cover is in the completely closed, vertically downwardly suspended position.

5. The apparatus of claim 4 wherein the cable withdrawal device includes a weight having a suspended rotary groove disc rotatably mounted to the weight for guiding the cable.

6. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container;

wherein the ratchet segment of the hatch cover and the ratchet wheel have periodically cooperating toothings periodically meshing lockingly with each other, and which are releasable upon the occurrence of an external force application, the ratchet segment of the hatch cover extending over an angle in respect of the rotational axis of the hatch cover within a range of angles of 20°–40°, the ratchet segment of the hatch cover being adapted to enter into mutually interlocking engagement with the ratchet wheel when the hatch cover occupies one of the open intermediate positions, sloping downwardly from the upper rotational axis, the open intermediate positions being situated within a pivotal angle area for the hatch cover of between about 10° and 60° relation to a vertical plane passing through the rotational axis of the hatch cover.

7. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container;

wherein the cable guide pulley of the combined cable guide pulley member and ratchet wheel member has two circumferential grooves for the cable, each of the two circumferential grooves having the form of a wedge groove having a V-shaped cross-section, wherein the groove defining surfaces converge in a direction radially inwardly.

8. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container wherein a portion of the electrical, live cable is encapsulated within a vertical, stationary pipe, the outer diameter thereof being substantially smaller than an internal diameter of the tubular protection container, an upper end of the stationary pipe being positioned below a lower hatchway defining edge formed in the protection container, from where the cable is guided downwardly and, thereupon, placed beneath and partially around a rotary groove disc that is rotationally mounted on an upper side of a weight that forms the cable withdrawal device, the weight being formed with a vertically throughgoing edge groove cooperating guidingly with said vertical, stationary pipe during the rectilinear movement of the weight up and down within the protection container, so that undesired rotation of the weight and the rotary groove disc is prevented during said reciprocating movement.

9. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container;

wherein a portion of the cable length inside the protection container is coiled on a rotary drum, wherein a radially inner end of the cable length coiled on the drum is provided with an insulated, electrically conducting swivel connector for connecting an outer end of the cable portion end and the axis thereof coinciding with the rotational axis of said drum.

10. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container wherein a rotational shaft defines the horizontal rotational axis of the hatch cover, the rotational shaft being placed such in relation to the circumference of the combined cable guide pulley member and the ratchet wheel member such that the rotational shaft forms a guide means for the cable in the intermediate, sloping positions of the hatch cover.

11. An apparatus for keeping an electrical, live cable in a protected, inoperative storage position, the cable having a free end including a first contact means adapted to be received within a second contact means belonging to a device operated by means of electrical power transferred thereto through the cable, the apparatus comprising:

a protection container;

a biased cable withdrawal device internally positioned within the protection container, the cable withdrawal device adapted to provide an inwardly directed tractive force to withdraw the cable into the protection container whenever the cable occupies an outside position while in a released condition and no external forces are acting thereon, wherein the cable withdrawal device allows the cable and the first contact means to be pulled out of the protection container by an outwardly directed tractive force that overcomes the inwardly directed tractive force generated by the cable withdrawal device;

a hatchway formed in a sidewall of the protection container to provide access to the interior of the protection container, wherein the cable can be pulled out of the protection container through the hatchway;

a hatch cover cantileveredly mounted at an axial end about a laterally extending horizontal rotational axis extending through an upper portion of the protection container, the hatch cover being pivotable about the rotational axis through a plurality of intermediate, sloping positions between a closed position in which the hatch cover is vertically suspended from the axial end and covers the hatchway and a horizontal, end position in which the hatch cover provides access to the open interior of the protection container through the hatchway, the hatch cover including a ratchet segment; and a combined cable guide pulley member and ratchet wheel member positioned within the protection container adjacent to the hatch cover, the cable guide pulley member guiding the cable, wherein during a portion of the pivotal movement of the hatch cover between the closed position and the horizontal end position, the ratchet segment of the hatch cover is in engagement with the ratchet wheel member such that the hatch cover is locked in one of the plurality of intermediate, sloping positions of use and rotation of the cable guide pulley member is blocked such that cable is prevented from being paid out of the protection container wherein the hatch cover includes an angulated handle portion which, in the vertically downwardly suspended closed position of the hatch cover, slants in a downward and outward direction away from an adjacent outer mantle face of the protection container.

* * * * *